United States Patent [19]
Tanaka

[11] Patent Number: 5,207,486
[45] Date of Patent: May 4, 1993

[54] BRAKING SYSTEM FOR VEHICLE

[75] Inventor: Ryuichi Tanaka, Kanagawa, Japan

[73] Assignee: Nippon Air Brake Co., Ltd., Kobe, Japan

[21] Appl. No.: 846,292

[22] Filed: Mar. 3, 1992

[30] Foreign Application Priority Data

Mar. 11, 1991 [JP] Japan ................................. 3-070634

[51] Int. Cl.$^5$ .............................................. B60T 8/32
[52] U.S. Cl. ................................. 303/113.2; 303/87; 303/116.1; 303/119.1; 303/900; 303/68; 303/901
[58] Field of Search .............. 303/87, 113 R, 68, 84.1, 303/84.2, 116 R, 119 R, 119 SV, DIG. 5, DIG. 6, 113 TR, 116 SP, 116 PC, 116 WP, 9.62, 9.75, 9.73, 9.74, 10–12, 69, 74, 81

[56] References Cited

U.S. PATENT DOCUMENTS

| | | | |
|---|---|---|---|
| 2,770,948 | 11/1956 | Porter | 303/84.1 |
| 4,188,073 | 2/1980 | Ishikawa et al. | 303/9.62 X |
| 4,395,073 | 7/1983 | Arikawa et al. | 303/116 R |
| 4,453,782 | 6/1984 | Arikawa et al. | 303/116 R |
| 4,765,692 | 8/1988 | Miyake | 303/115 PP |
| 4,812,777 | 3/1989 | Shirai | 303/115 PP X |
| 5,007,687 | 4/1991 | Kircher et al. | 303/113 R |
| 5,020,864 | 6/1991 | Tanaka . | |
| 5,031,969 | 7/1991 | Siegel | 303/87 X |
| 5,035,469 | 7/1991 | Geilen et al. | 303/87 |
| 5,074,625 | 12/1991 | Jones | 303/87 |
| 5,127,712 | 7/1992 | Rizk et al. | 303/87 |

FOREIGN PATENT DOCUMENTS

0360378 3/1990 European Pat. Off. .
0361502 4/1990 European Pat. Off. .
0382940 8/1990 European Pat. Off. .

Primary Examiner—Douglas C. Butler
Attorney, Agent, or Firm—James P. Ryther

[57] ABSTRACT

A braking system for a vehicle which includes a master cylinder, and a wheel cylinder for braking a wheel with a brake fluid pressure supplied from the master cylinder. A pulsating-pressure absorbing apparatus is arranged between the master cylinder and the wheel cylinder. The pulsating-pressure absorbing apparatus includes a main body, an inlet formed in the main body and connected to the master cylinder, an outlet formed in the main body and connected to a side of the wheel cylinder, and a stepped hole formed in communication with the inlet and outlet. A stepped plunger is slidably fitted into the stepped hole, and a check valve is arranged in a path defined within the plunger for permitting brake fluid to flow from the inlet towards the outlet and for inhibiting brake fluid from flowing from the outlet towards the inlet. A throttle is arranged in the path for limiting brake fluid flowing from the side of the outlet towards the side of the inlet whereby, when the stepped plunger is located at a first position adjacent the outlet, the throttle is operative, and when the stepped plunger is located at a second position adjacent the inlet, the throttle is inoperative and the check valve is opened for permitting brake fluid to flow freely between the inlet and outlet. A spring is provided for urging the stepped plunger towards the inlet.

9 Claims, 2 Drawing Sheets

BRAKING SYSTEM FOR VEHICLE

BACKGROUND OF THE INVENTION

1. Field of the Invention

This invention relates to a braking system for vehicle, and more particularly to a braking system for vehicle in which the transmission of the pulsating pressure from the brake circuit to the fluid-pressure generating source or master cylinder is limited.

2. Description of the Prior Art

The U.S. Pat. No. 5,020,864 discloses the braking system for a vehicle which comprises a brake fluid pressure generating source; a brake-applying apparatus for braking a wheel or wheels with the brake fluid pressure supplied from said brake fluid pressure generating source; a pulsating-pressure absorbing apparatus arranged between said brake fluid pressure generating source and said brake-applying apparatus; and throttling means arranged in said pulsating-pressure absorbing apparatus, for limiting the brake fluid flowing from the side of said brake-applying apparatus towards said brake fluid pressure generating source, wherein said pulsating-pressure absorbing apparatus further comprises a main body, a plunger slidably fitted through a hole of said main body and being arranged between the inlet and outlet of said main body and further being movable in response to the brake fluid pressure difference between both sides of said plunger, a poppet-type valve body arranged in an axial hole of said plunger and in the inside wall of said plunger, a spherical head portion of said valve body being contactable with said valve seat, a rod portion of said valve body passing through a narrow end portion of said axial hole and said throttle means being formed as a cut off groove in said spherical head portion of the valve body, wherein when said plunger is located at the first side of said outlet, said spherical head portion of the valve body contacts with said valve seat and said cut-out groove functions as a throttle between said spherical head portion of the valve body and said valve seat, and wherein when said plunger is located at the second side of said inlet, said spherical head portion of the valve body is separated from said valve seat.

In the above-described braking system, the plunger is urged towards the outlet side by a spring, and it is located at such a position that brake fluid is returned through the throttling means into the master cylinder (brake fluid pressure generating source) in the lower pressure range. Accordingly, the braking force is slowly decreased in the lower pressure range. It requires much time, and so the responsibility is bad.

In the traction control system, some pressurized fluid of the fluid pressure pump is supplied to the brake-applying apparatus for the driven wheel, so as to prevent slip of the driven wheel on the starting of the vehicle and acceleration thereof. When the brake fluid is slowly returned to the master cylinder side for control cannot be smoothly effected.

SUMMARY OF THE INVENTION

It is an object of this invention to provide a braking system for vehicle in which a pulsating-pressure absorbing apparatus can permit the brake to be smoothly decreased even in the lower pressure region.

In accordance with an aspect of this invention, a braking system for vehicle including:

(A) a brake fluid pressure generating source;
(B) a brake-applying apparatus for braking a wheel or wheels with the brake fluid pressure supplied from said brake fluid pressure generating source; and
(C) a pulsating-pressure absorbing apparatus arranged between said brake fluid pressure generating source and said brake-applying apparatus, wherein said pulsating-pressure absorbing apparatus includes
  (a) a main body,
  (b) an inlet formed in said main body and connected to said brake fluid pressure generating source,
  (c) an outlet formed in said main body and connected to the side of said brake-applying apparatus,
  (d) a stepped hole formed in communication with said inlet and outlet, the diameter of said stepped hole at the side of said inlet being larger than that at the side of said outlet,
  (e) a stepped plunger slidably fitted into said stepped hole, the diameter of said stepped plunger at the side of said inlet being larger than that at the side of said outlet,
  (f) a path making said inlet to communicate with said outlet,
  (g) check valve means arranged in said path for permitting brake fluid to flow from said inlet towards said outlet and inhibiting brake fluid from flowing, from said outlet towards said inlet, and
  (h) throttle means arranged in said path for limiting the brake fluid flowing from the side of said outlet towards the side of said inlet, wherein, when said stepped plunger is located at a first position adjacent said outlet, said throttle means is operative, and when said stepped plunger is located at a second position adjacent said inlet, said throttle means is inoperative, and said check valve means is opened for permitting brake fluid to flow freely between said inlet and outlet, the improvements in which spring means is arranged for urging said stepped plunger towards said inlet.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 1:
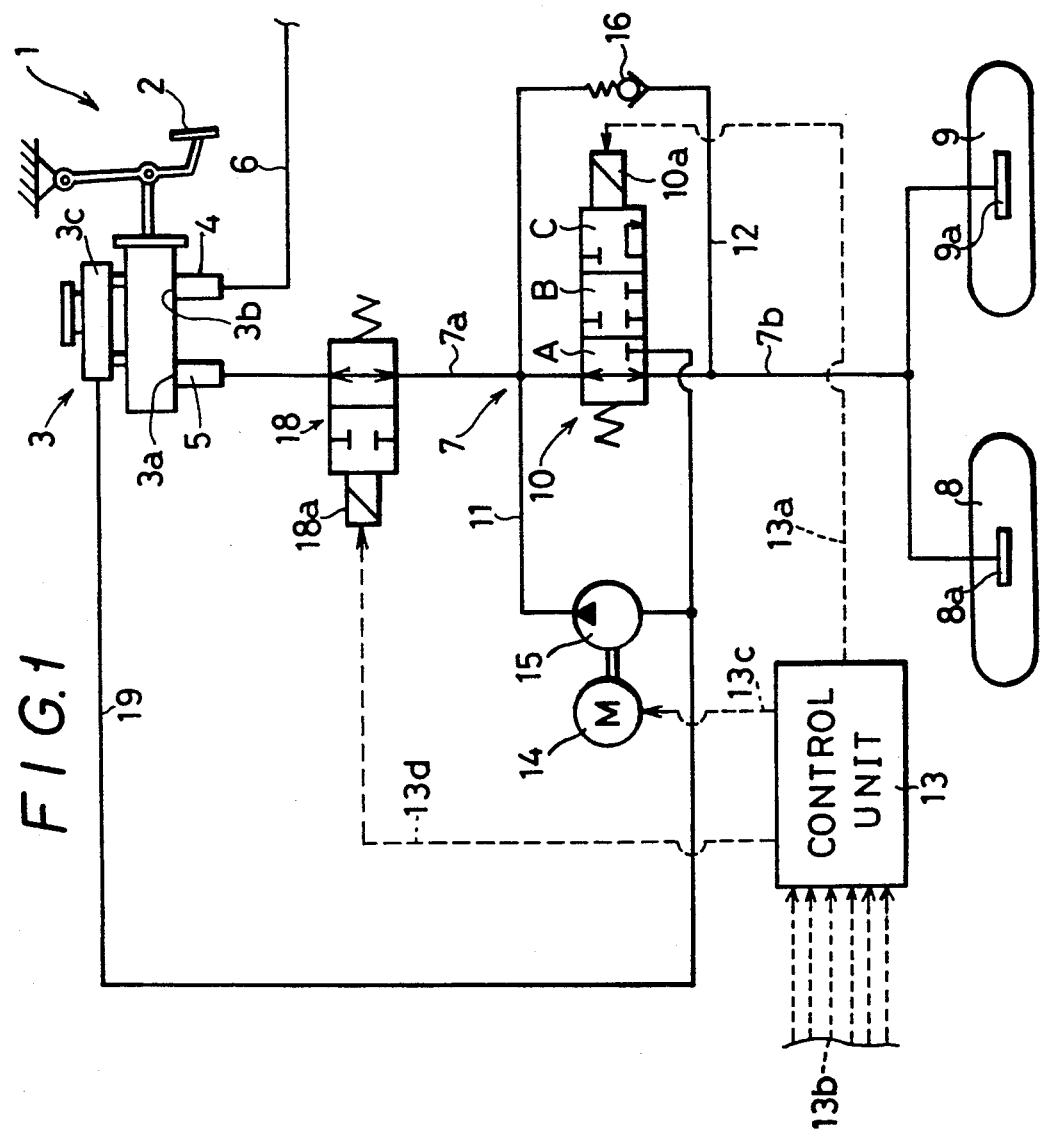
FIG. 1. is a schematic view showing the whole of a traction/anti-skid braking system for vehicle according to an embodiment of this invention.

Next, a traction/anti-skid braking system according to an embodiment of this invention will be described with reference to the drawings.

First, the whole of the traction/anti-skid braking system will be described with reference to FIG. 1. The system is generally represented by a reference numeral 1. A brake pedal 2 is connected to a tandem master cylinder 3 which has a well-known construction, and has two independent fluid pressure chambers. When the brake pedal 2 is trodden, fluid pressures are generated in the fluid pressure chambers. Pulsating-pressure-damping or absorbing apparatus 4 and 5 are screwedly fixed to outlet portions 3b and 3a communicating with the fluid pressure chambers of the tandem master cylinder 3, respectively.

One of the fluid pressure chambers is connected through the one pulsating-pressure absorbing apparatus 4 and a conduit 6 to not-shown front left and right wheel brake apparatus. The other of the fluid pressure chambers is connected through the other pulsating-pressure absorbing apparatus 5 and a conduit 7 to wheel cylinders 8a and 9a of rear left and right wheels 8 and 9.

The conduit 7 consists of a conduit portion 7a and another conduit portion 7b. A traction/anti-skid control valve 10 is arranged between the conduit portions 7a and 7b. A cut-off change-over valve 18 is connected in the conduit portion 7a between the pulsating-pressure absorbing apparatus 5 and the traction/anti-skid control valve 10. A brake relieving circuit 11 is connected between the traction/anti-skid control valve 10 and the conduit portion 7a. An auxiliary circuit 12 is connected between the conduit portions 7a and 7b in parallel with traction/anti-skid control valve 10.

The traction/anti-skid control valve 10 is a three-position three-port electro-magnetic valve. An output terminal of a control unit 13 is connected to a solenoid portion 10a of the traction/anti-skid control valve 10 through an electric wire 13a. And another output terminal of the control unit 13 is connected to a solenoid portion 18a of the cut-off change-over valve 18 through an electric wire 13d. Not shown wheel speed sensors associated with the wheels are connected to input terminals of the control unit 13 through electric wires 13b. It evaluates and measures skid conditions or rotational behaviors of the wheels on the basis of the output signals of the wheel speed sensors.

In a position A for brake-increasing, the conduit portions 7a and 7b are made to communicate with each other and the brake relieving circuit 11 is cut off, by the traction/anti-skid control valve 10. In a position B for brake-holding, the conduit portions 7a and 7b are cut off from each other, and the brake relieving circuit 11 is cut off, by the traction/anti-skid control valve 10. And in a position C for brake-relieving, the conduit portions 7a and 7b are cut off from each other, while the conduit portion 7b is made to communicate with the brake relieving circuit 11, by the traction/anti-skid control valve 10.

A fluid pressure pump 15 is connected in the brake relieving circuit 11, and it is driven by an electric motor 14 to which a drive signal is supplied from an output terminal of the control unit 13 through an electric wire 13c. Brake fluid discharged through the traction/anti-skid control valve 10 from the wheel cylinders 8a and 9a is pressurized and returned to the side of the master cylinder 3 by the fluid pressure pump 15. A suction opening of the fluid pressure pump 15 is connected with a reservoir 3c of the master cylinder 3 through a conduit 19. A check valve 16 is connected in the auxiliary circuit 12, and it permits fluid to flow only from the side of the wheel cylinders 8a and 9a towards the side of the master cylinder 3.

In FIG. 1, an anti-skid braking apparatus for the front left and right wheels is omitted. The apparatus shown in FIG. 1 is provided for the front left and right wheels which are driven wheels. However, the one fluid pressure pump 15 is commonly used for the rear and front wheels, and the pressurized brake fluid from the wheel cylinders of the front and rear wheels is returned to the master cylinder 3 by the one fluid pressure pump 15.

Next, the details of the pulsating-pressure absorbing apparatus 4 and 5 will be described with reference to FIG. 2. The apparatus 4 and 5 are equal to each other in construction. Accordingly, only one 5 of them will be described hereinafter.

In the pulsating-pressure absorbing apparatus 5, a main body 20 is screwedly fixed to the outlet portion 3a of the tandem master cylinder 3 at a threaded portion 21. A seal ring 22 is fitted to the main body 20 at a stepped portion near the threaded portion 21. The pulsating-pressure absorbing apparatus 5 is liquid-tightly fixed to the outlet portion 3a of the tandem master cylinder 3, by the seal ring 22.

A connecting hole 23 for the conduit portion 7a (FIG. 1) is formed at the opposite side to the threaded portion 21 in the main body 20. A stepped hole 24 communicating with the connecting hole 23 and aligned with the latter is formed in the main body 20, and it is reduced steppedly towards the connecting hole 23 in diameter. A small-diameter hole portion 25 is nearest to the connecting hole 23. A large-diameter hole portion 29 is formed continuously through a stepped portion 26.

A stepped plunger 42 is slidably fitted into the stepped hole 24 of the main body 20. Rubber seal ring 45 and cup-seal 46 are tightly fitted to the stepped plunger 42 at a smaller diameter portion 40 and a larger diameter portion 41 respectively, which are slidably fitted to the small diameter hole portion 25 of the stepped hole 24 and the large-diameter hole portion 29 thereof, respectively.

An opening end portion 33 of the main body 20 is caulked and deformed as shown. A disk 43 having holes 43a is fixed at the thus deformed opening end portion 33. A return spring 44 is compressedly extended between the stepped portion 26 and the large diameter portion 41 of the stepped plunger 42. Accordingly, the stepped plunger 42 is urged towards the side of the opening end portion 33, namely the side of the input opening of the main body 20 so that its one end portion is made to contact with the disk 43.

A stepped through hole 50 is axially formed in the plunger 42. A cylindrical valve-seat member 51 is fixed to the right opening end of the stepped through hole 50 by caulking, which constitutes a part of the plunger 42. The inner peripheral edge portion of the valve seat member 51 functions as a valve seat 52. A poppet-type valve body 53 is arranged in the stepped through hole 50 in face to the valve seat 52, and it is urged to the valve seat 52 by a valve spring 54 the spring force of which is weak.

Cut-out paths 51b are formed in the end of the valve seat member 51. A cut-out groove 51a is formed as a throttle in the top of the valve seat member 51. The valve-seat member 51 and the valve body 53 are made of metallic material of the iron group, and they are hardened by the quenching treatment in the manufacturing step. The hardness of them is considerablly large. The area and shape of the throttle cut-out groove 51a are determined by the required absorbing effect.

A rod portion 56 is formed integrally with the valve body 53, and it passes through the valve seat member 51. When the stepped plunger 42 is moved to the disk 43 by the return spring 44 and the fluid pressure of the output opening side of the main body 20, also the rod portion 56 of the valve body 53 contacts with the disk 43. Accordingly, the valve body 53 is separated from the valve seat 52 as shown in FIG. 2. The separation distance or valve lift between the valve body 53 and the valve seat 52 is sufficiently long. The length of the rod portion 56 of the valve body 53 is so large as to obtain the above separation distance or valve lift. It is preferable that the flow resistance in the valve lift is as low as that of a usual conduit such as the conduit portion 7a. The ratio of the effective pressure-receiving area of the smaller-diameter portion 40 at the side of the connecting hole 23, to the effective pressure-receiving area of the larger-diameter portion 41 at the side of the master cylinder 3 in the plunger 42 is ½. Thus, the former area:- the latter area=1:2. Assuming that the static pressure of 50 kgf/cm² is applied to the plunger 42 when the plunger 42 have moved leftwards from the position shown in FIG. 2 and the poppet-type valve body 53 is in contact with the valve seat 52, the latter is not moved unless the amplitude or width of the pulsating pressure at the side of the connecting hole 23 becomes higher than 50 kgf/cm². The ratio of the effective pressure-receiving area of the smaller-diameter portion 40 to the effective pressure receiving area of the larger-diameter portion 41 is suitably selected by the amplitude of the pulsating pressure depending on the kind of the vehicle provided with the shown apparatus.

When the brake is applied in a traction control operation which will be described in detail later, an energizing signal is supplied through the electric wire 13d from the control unit 13 to the solenoid portion 18a of the cut-off change-over valve 18 connected in the conduit portion 7a. The fluid pressure pump 15 is driven.

Next, there will be described operations of the above described traction/anti-skid apparatus 1. 1.

First, general operations of the whole of the apparatus shown in FIG. 1 will be described.

When the brake pedal 2 is trodden, fluid pressures are generated in the not-shown-fluid pressure chambers of the tandem master cylinder 3 and they are supplied through the pulsating-pressure receiving apparatus 4 and 5 to the conduits 6 and 7. The anti-skid control valve 10 is taking the position A for brake increasing. Accordingly, they are supplied to the wheel cylinders 8a and 9a of the rear wheels 8 and 9 and to the not-shown wheel cylinders of the front wheels. The wheels are braked.

When the wheels tend to skid and the control unit 13 judges the brakes of the wheels to be relieved, the control unit 13 supplies a brake-decreasing instruction to the valve 10 and a motor drive signal to the motor 14. The pressure at the side of the master cylinder 3 increases to a pressure depending on the treading force to the brake pedal 2. However, since the valve 10 is changed over to the position C by the brake-relieving instruction, a part of the brake fluid supplied to the wheel cylinders 8a and 9a is discharged into the brake relieving circuit 11 through the valve 10. When the wheels are released from skidding, the control unit 13 stops the brake relieving instruction and generates a brake holding instruction. Thus, the valve 10 is changed over to the position B for brake holding. The fluid pressures of the wheel cylinders 8a and 9a are maintained at constant The fluid pressure pump 15 is driven by the motor 14, and pressurizes and returns the brake fluid discharged from the wheel cylinders 8a and 9a through the valve 10, to the side of the master cylinder 3. When the fluid pressure pump 15 is of the plunger type, the fluid pressure is intermittently supplied to the conduit portion 7a. However the pulsating pressure is absorbed by the pulsating-pressure absorbing apparatus 5 and then the brake fluid is returned to the master cylinder 3.

Hereafter, when the wheels are released much from skid conditions and the rotational speeds of the wheels are considerably recovered, the control unit 13 changes over the valve 10 into the position A for brake increasing, and the brake fluid is supplied from the master cylinder 3 into the wheel cylinders 8a and 9a. The braking forces to the wheels increase.

Hereafter, the valve 10 is so changed over that the wheels do not skid. The decrease, holding and increasing of the fluid pressure are repeated in accordance with the instructions from the control unit 13. When the brake pedal 2 is released from treading, the brake fluid is returned through the check valve 16 from the wheel cylinders 8a and 9a to the master cylinder 3. It is returned also through the valve 10 after the end of the anti-skid control.

Next, operations of the pulsating-pressure absorbing apparatus 5 during the anti-skid control will be described.

Figure 2:
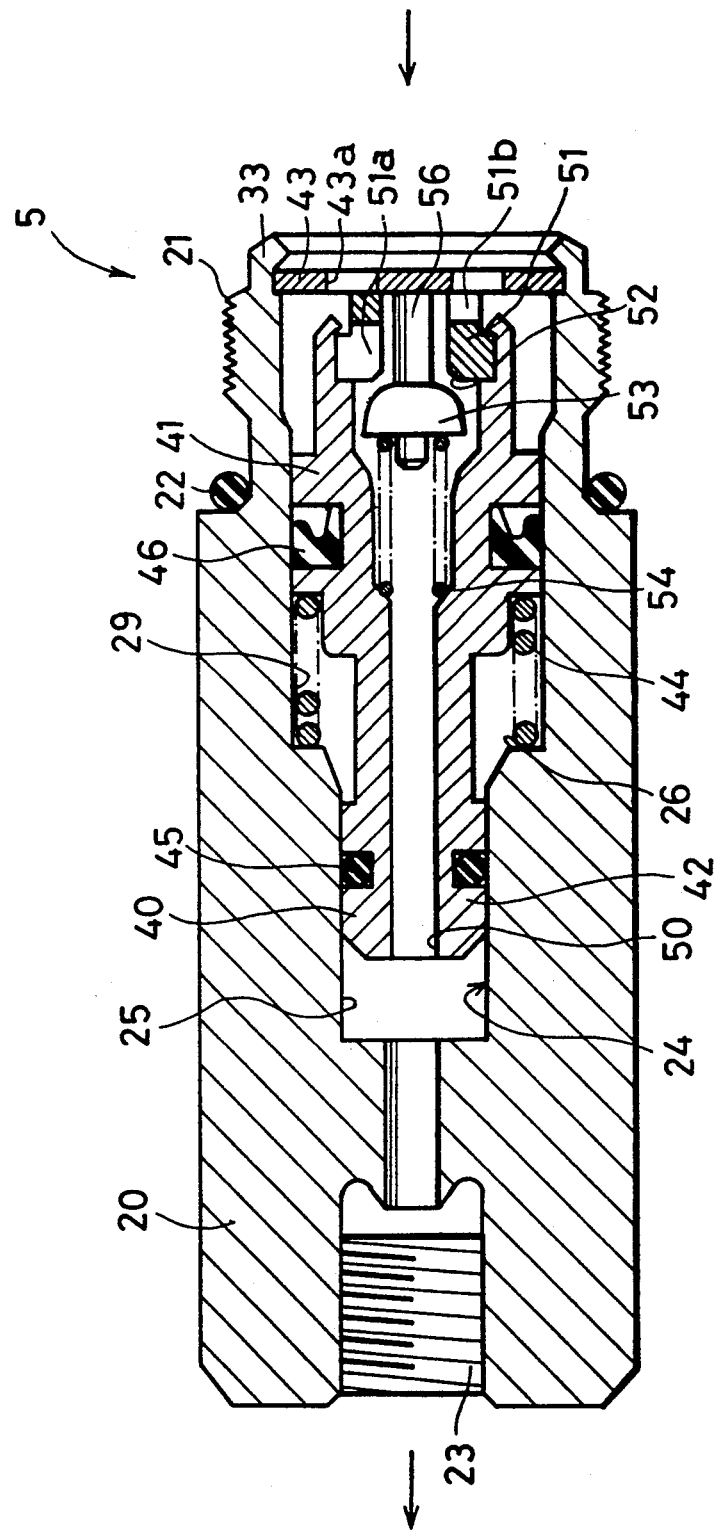
FIG. 2. is an enlarged cross-sectional view of a pulsating-pressure absorbing apparatus in FIG. 1, under the normal condition.

FIG. 2 shows the condition at the time when no brake is applied.

When no brake is applied, no fluid pressure is applied to the stepped plunger 42. It contacts with the disk 43 by the urging force of the spring 44. Accordingly, the rod portion 56 of the valve body 53 also contacts with the disk 43, and so the valve body 53 is separated from the valve seat 52.

In the condition shown in FIG. 2, when the pressurized fluid is supplied from the master cylinder 3, it flows through the through hole 50. Since the fluid-pressure receiving area of the plunger 42 is larger at the side of the master cylinder 3 than at the side of the conduit portion 7a, the plunger 42 begins to move leftwards against the return spring 44 when the fluid pressure have increased to a predetermined pressure. Thus, the valve body 53 seats on the valve seat 52. Then it works as a check valve and the cut-out groove 51a functions as a throttle.

With the start of the anti-skid operation, the discharging pressure of the fluid pressure pump 15 is transmitted into the connecting hole 23. It is pulsating. With respect to the valve body 53, the fluid pressure at the side of the connecting hole 23 is higher than the fluid pressure at the side of the master cylinder 3. Accordingly, the brake fluid flows from the connecting hole 23 towards the master cylinder 3 through the cut-out path 51a as a throttle groove. At that time, the pulsating pressure is attenuated by the throttling effect of the cut-off path 51a. The pulsating pressure of the fluid pressure pump 15 includes the pressure increase due to the returned fluid to the master cylinder 3. However, the plunger 42 is not moved rightwards, since there is the predetermined difference between the pressure receiving areas of the plunger 42 at both the ends. Accordingly, the pulsating pressure is prevented from transmitting to the master cylinder side. Thus, the pulsating pressure of the brake fluid from the fluid pressure pump 15 is attenuated before the brake fluid from the fluid pressure pump 15 is returned to the master cylinder 3. Although the brake pedal 2 is somewhat pushed backwards by the returned fluid, the pedal feeling is considerably good, since the pulsating pressure is greatly attenuated.

When the brake pedal 2 is released from treading, the pressure at the inside of the master cylinder 3 rapidly decreases and becomes negative. The plunger 42 rapidly moves rightwards. The rod portion 56 of the valve body 53 contacts with the disk 43, and the valve seat member 51 contacts with the disk 43. Thus, the valve body 53 is separated from the valve seat 52. The brake fluid returns freely through the large gap between the valve body 53 and the valve seat 52 into the master cylinder 3. Accordingly, the brake can be rapidly relieved.

When the brake is sufficiently relieved, the fluid pressure at the side of the connecting hole 23 becomes lower. A force which pushes the plunger 42 leftwards is generated due to the difference between the pressure-receiving areas of the plunger 42 at both the ends. However, by urging force of the return spring 44, the plunger 42 is not moved leftwards. Thus, it keeps the position shown in FIG. 2. Accordingly, even at the low pressure region, the brake fluid can be returned smoothly from the side of the wheel cylinders 8a and 9a to the side of the master cylinder 3.

Next, there will be described operations of the traction control according to this embodiment.

For example, on the starting of the vehicle, when the control unit 13 judges that the driving wheels 8 and 9 slip due to over-driving torque transmitted from an engine, it supplies the energizing signal to the solenoid portion 18a of the cut-off change-over valve 18. Thereby, the cut-off change-over valve 18 which has been in communicating position at the time of the above described anti-skid control operation, is changed over into the cut-off position. Thus, the side of the master cylinder 3 and the side of the wheel cylinders 8a, 9a are cut off from each other. Also, the motor drive signal is supplied from the control unit 13 to the electric motor 14. So the fluid pressure pump 15 is driven. Thus, the sucked and pressurized fluid by the fluid pressure pump 15 from the reservoir 3c through the conduit 19 is supplied to the wheel cylinders 8a and 9a of the wheels 8 and 9 through the valve 10 which is in the position A. Accordingly, a braking force is applied to the wheels 8 and 9 which are slipping now due to the over driving torque, and the driving slip of the wheels 8 and 9 is decreased. According to this embodiment, the traction control, that is a driving slip control, is done precisely. Now, when the control unit 13 judges that the braking force is too much, an electric current on the level of "½" is supplied to the solenoid portion 10a of the valve 10 from the control unit 13. Thereby, the valve 10 is changed over to the position B. Thus, since the conduit portions 7a and 7b are cut off from each other, the braking force applied to the wheels 8 and 9 is held at constant. Further, when the control unit 13 judges that the brake should be relieved, the electric current which is supplied from the control unit 13 to the solenoid portion 10a, is changed over onto the level of "1". Thereby, the valve 10 is changed over to the position C. Thus, the pressurized fluid of the wheel cylinders 8a and 9a is discharged towards the brake relieving circuit 11. And it is supplied to the side of the conduit portion 7a by the fluid pressure pump 15.

When the braking force is held or relieved, the electric current which is supplied to the solenoid portion 18a of the cut-off change-over valve 18, becomes "0" level. So the cut-off change-over valve 18 takes the communicating position again. Thus, the pressurized fluid from the fluid pressure pump 15 is supplied through the cut-off change-over valve 18 which is in the communicating position, to the side of the pulsating-pressure absorbing apparatus 5. Since the brake pedal 2 is not trodden now, the fluid pressure in the fluid-pressure generating-chamber of the master cylinder 3 is "0". Accordingly, the pulsating-pressure absorbing apparatus 5 takes the position shown in FIG. 2. Thus, the plunger 42 contacts with the disk 43. So the poppet-type valve body 53 is separated from the valve-seat member 51 and a large gap is made between the poppet-type valve body 53 and the valve-seat member 51. The pressurized fluid from the fluid pressure pump 15 returns freely through the stepped through hole 50 of the plunger 42 and the large gap towards the side of the master cylinder 3. Particularly, when the braking force is relieved, the pressurized fluid, which is returned in large amount from the wheel cylinders 8a and 9a by the fluid pressure pump 15, can be returned freely through the pulsating-pressure absorbing apparatus 5 towards the side of the master cylinder 3, since the throttle is inoperative.

Accordingly, the control in which the fluid pressure is increased, maintained or decreased, can be done smoothly so that the driving slip value of the wheels 8 and 9 is controlled to become an optimum value in the traction control. And the driving slip value can be made to become the optimum value in a short time.

While the preferred embodiment has been described, variations thereto will occur to those skilled in the art within the scope of the present inventive concepts which are delineated by the following claims.

For example, in the above embodiment, although the wheels 8 and 9 connected in parallel with the conduit portion 7b have been treated as the driven wheels and the other wheels at the side of the conduit 6 connected to the other fluid-pressure generating-chamber in the master cylinder 3 have not been described at all, all of the four wheels may be treated as the driven wheels. In this case, the traction control and anti-skid control may be done by the same conduit construction as shown in FIG. 1. Further, the conduit construction may be arranged for the respective wheels, and the respective wheels may controlled independently at the time of the traction control or anti-skid control operation. Thus, for example, the four valves 10 may be arranged for the respective wheels. Such a control system is called "Four channel type". Further, in the above embodiment, although there has not been mentioned a conduit type of the brake system, of course, it can be applied to both a diagonal-connection type and a front-rear separation type.

Further, in the above described embodiment, the brake relieving circuit 11 is connected to the side of the suction opening of the fluid pressure pump 15 and the pressurized fluid from the side of the wheel cylinders 8a and 9a is supplied directly through the brake relieving circuit 11 to the side of the conduit portion 7a by the fluid pressure pump 15. However, a low-pressure reservoir may be arranged at the side of the suction opening of the fluid pressure pump 15. In this case, when the brake is relieved, the pressurized fluid from the wheel cylinders 8a and 9a may be stored in the low-pressure reservoir temporarily. After that, the fluid may be sucked by the fluid pressure pump 15 at once and it may be supplied to the side of the conduit portion 7a.

Further, in the above embodiment, although the system in which both the traction control and the anti-skid control are done has been described, this invention can be applied to the system in which only the anti-skid control is done.

Further, in the above embodiment, the cut-out groove 51a is formed in the valve seat member 51. Instead, a cut-out groove may be formed in the spherical head portion 53 of the valve body.

Or cut-out grooves may be formed both in the valve seat member 51 and in the spherical bead portion of the valve body 53.

What is claimed is:

1. In a braking system for a vehicle including:
   (A) a brake fluid pressure generating source;
   (B) a brake-applying apparatus for braking a wheel or wheels with brake fluid pressure supplied from said brake fluid pressure generating source; and
   (C) a pulsating-pressure absorbing apparatus arranged between said brake fluid pressure generating source and said brake-applying apparatus, said pulsating-pressure absorbing apparatus including:
   (a) a main body,
   (b) an inlet formed in said main body and connected to said brake fluid pressure generating source,
   (c) an outlet formed in said main body and connected to a side of said brake-applying apparatus,
   (d) a stepped hole formed in communication with said inlet and outlet, the diameter of said stepped hole being larger at said inlet than at said outlet,
   (e) a stepped plunger slidably fitted into said stepped hole, the diameter of said stepped plunger being larger adjacent said inlet than adjacent said outlet,
   (f) a path defined by said plunger communicating said inlet with said outlet,
   (g) check valve means arranged in said path for permitting brake fluid to flow from said inlet towards said outlet and for inhibiting brake fluid from flowing from said outlet towards said inlet, and
   (h) throttle means arranged in said path for limiting brake fluid flow from said outlet towards said inlet whereby, when said stepped plunger is located at a first position adjacent said outlet, said throttle means is operative, and when said stepped plunger is located at a second position toward said inlet, said throttle means is inoperative with said check valve means being opened for permitting brake fluid to flow freely between said inlet and outlet, and spring means for urging said stepped plunger towards said second position adjacent said inlet.

2. A braking system according to claim 1 in which said check valve means comprises a poppet-type valve body arranged in an axial hole of said plunger and a valve seat formed integrally with said plunger, a spherical head portion of said valve body being contactable with said valve seat, and a rod portion of said valve body passing through a narrow end portion of said axial hole, and including a cut-out groove formed as said throttle means in said spherical head portion of said valve seat whereby, when said plunger is located at said first position, said spherical head portion of the valve body contacts with said valve seat, and said cut-out groove functions as said throttle means between said spherical head portion of the valve body and said valve seat, and wherein when said plunger is located at said second position, said spherical head portion of the valve body is separated from said valve seat, and said throttle means becomes inoperative.

3. A braking system according to claim 1 in which said pulsating-pressure absorbing apparatus is fixed to an outlet of said brake pressure generating source.

4. A braking system for a vehicle comprising:
   (A) a master cylinder;
   (B) a wheel cylinder for braking a wheel with brake fluid pressure supplied from said master cylinder;
   (C) an anti-skid control valve apparatus arranged between said master cylinder and said wheel cylinder including control means for evaluating and measuring skid conditions and wheel behaviors and for generating instructions for said anti-skid control valve apparatus,
   (D) a brake relieving circuit one end of which communicates with said master cylinder and another end of which communicates with said anti-skid control valve apparatus;
   (E) a fluid pressure pump arranged in said brake relieving circuit for pressurizing and returning brake fluid discharged through said anti-skid control apparatus from said wheel cylinder; and
   (F) a pulsating-pressure absorbing apparatus arranged between said fluid pressure pump and said master cylinder for limiting transmission of pulsating pressure of said fluid pressure pump;
   wherein said pulsating-pressure absorbing apparatus includes
   (a) a main body,
   (b) an inlet formed in said main body and connected to said brake fluid pressure generating source,
   (c) an outlet formed in said main body and connected to a side of said wheel cylinder,
   (d) a stepped hole formed in communication with said inlet and outlet, the diameter of said stepped hole being larger at said inlet than at said outlet,
   (e) a stepped plunger slidably fitted into said stepped hole, the diameter of said stepped plunger being larger adjacent said inlet said adjacent said outlet,
   (f) a path defined by said plunger communicating said inlet with said outlet,
   (g) check valve means arranged in said path for permitting brake fluid to flow from said inlet towards said outlet and for inhibiting brake fluid from flowing from said outlet towards said inlet, and
   (h) throttle means arranged in said path for limiting brake fluid flow from said outlet towards said inlet whereby, when said stepped plunger is located at a first position adjacent said outlet, said throttle means is operative, and when said stepped plunger is located at a second position toward said inlet, said throttle means is inoperative with said check valve means being opened for permitting brake fluid to flow freely between said inlet and outlet, and spring means for urging said stepped plunger towards said second position adjacent said inlet:

5. A braking system according to claim 4 in which said check valve means comprises a poppet-type valve body arranged in an axial hole of said plunger and a valve seat formed integrally with said plunger, a spherical head portion of said valve body being contactable with said valve seat, and a rod portion of said valve body passing through a narrow end portion of said axial hole, and including a cut-out groove formed as said throttle means in said spherical head portion of said valve set whereby, when said plunger is located at said first position, said spherical head portion of the valve body contacts with said valve seat, and said cut-out groove functions as said throttle means between said spherical head portion of the valve body and said valve seat, and wherein when said plunger is located at said second position, said spherical head portion of the valve body is separated from said valve seat, and said throttle means becomes inoperative.

6. A braking system according to claim 4 in which said pulsating-pressure absorbing apparatus is fixed to an outlet of said master cylinder.

7. A braking system for a vehicle comprising:
(A) a master cylinder;
(B) a wheel cylinder for braking a wheel with brake fluid pressure supplied from said master cylinder;
(C) a cut-off valve arranged between said master cylinder and said wheel cylinder which is cut-off on traction control;
(D) an anti-skid control valve apparatus arranged between said cut-off valve and said wheel cylinder in a control unit for evaluating or measuring a skid condition or behavior of said wheel;
(E) a brake relieving circuit one end of which communicates with said master cylinder and another end of which communicates with said anti-skid control valve apparatus;
(F) a fluid pressure pump arranged in said brake relieving circuit for pressurizing and returning brake fluid discharged through said anti-skid control valve apparatus from said wheel cylinder; and
(G) a pulsating pressure absorbing apparatus arranged between said fluid pressure pump and said master cylinder for limiting transmission of pulsating pressure of said fluid pressure pump; wherein said pulsating-pressure absorbing apparatus includes
(a) a main body;
(b) an inlet formed in said main body and connected to said master cylinder,
(c) an outlet formed in said main body and connected to a side of said wheel cylinder,
(d) a stepped hole formed in communication with said inlet and outlet, the diameter of said stepped hole being larger at said inlet than at said outlet,
(e) a stepped plunger slidably fitted into said stepped hole, the diameter of said stepped plunger being larger adjacent said inlet than adjacent said outlet,
(f) a path defined by said plunger communicating said inlet with said outlet,
(g) check valve means arranged in said path for permitting brake fluid to flow from said inlet towards said outlet and for inhibiting brake fluid from flowing from said outlet towards said inlet, and
(h) throttle means arranged in said path for limiting brake fluid flowing from the side of said outlet towards the side of said inlet whereby, when said stepped plunger is located at a first position adjacent said outlet, said throttle means is operative, and when said stepped plunger is located at a second position adjacent said inlet, said throttle means is inoperative, and said check valve means is opened for permitting brake fluid to flow freely between said inlet and outlet, and spring means for urging said stepped plunger towards said second position adjacent said inlet.

8. A braking system according to claim 7 in which said check valve means comprises a poppet-type valve body arranged in an axial hole of said plunger and a valve seat formed integrally with said plunger, a spherical head portion of said valve body being contactable with said valve seat, and a rod portion of said valve body passing through a narrow end portion of said axial hole, and including a cut-out groove formed as said throttle means in said spherical head portion of said valve seat whereby, when said plunger is located at said first position, said spherical head portion of the valve body contacts with said valve seat, and said cut-out groove functions as said throttle means between said spherical head portion of the valve body and said valve seat, and wherein when said plunger is located at said second position, said spherical head portion of the valve body is separated from said valve seat, and said throttle means becomes inoperative.

9. A braking system according to claim 7 in which said pulsating-pressure absorbing apparatus is fixed to an outlet of said master cylinder.

* * * * *